J. B. FOSTER.
AUTOMOBILE JACK.
APPLICATION FILED JAN. 31, 1911.
1,005,528.
Patented Oct. 10, 1911.
2 SHEETS—SHEET 1.
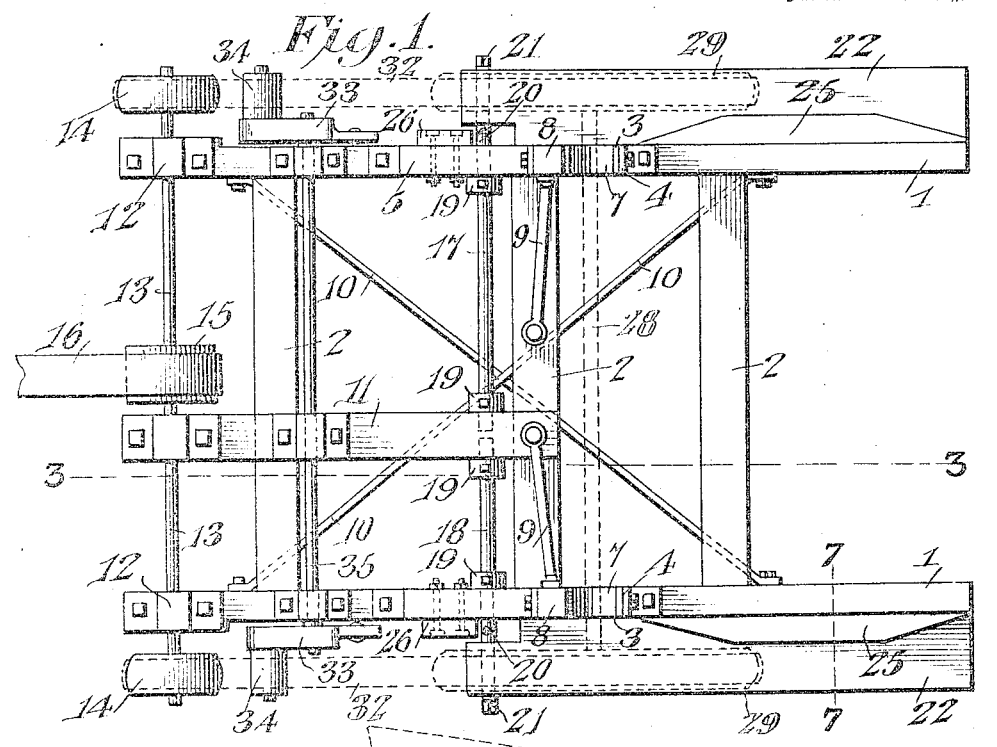
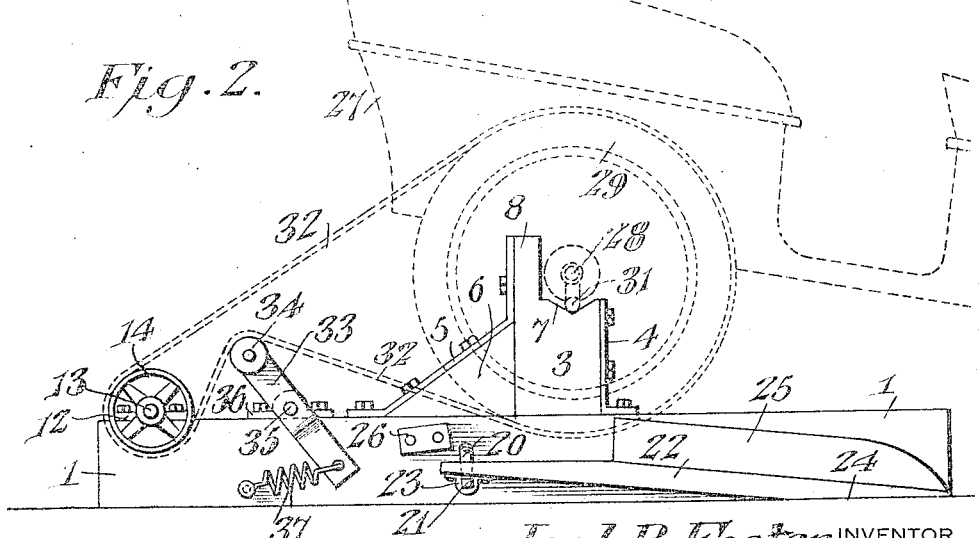
WITNESSES
Joel B. Foster, INVENTOR
BY
ATTORNEY J. B. FOSTER.
AUTOMOBILE JACK.
APPLICATION FILED JAN. 31, 1911.
1,005,528.
Patented Oct. 10, 1911.
2 SHEETS—SHEET 2.
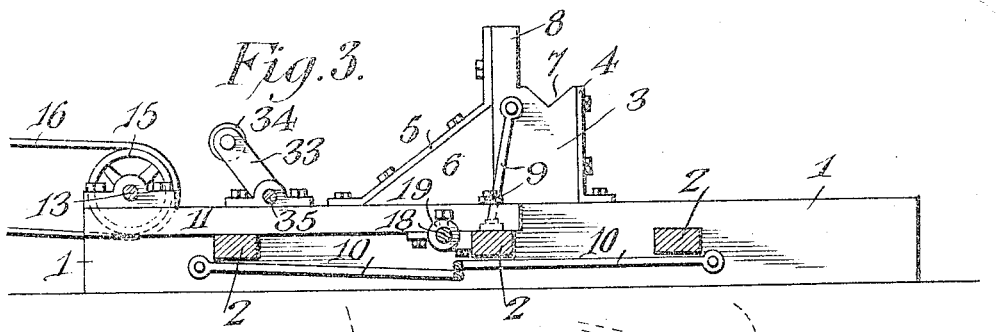
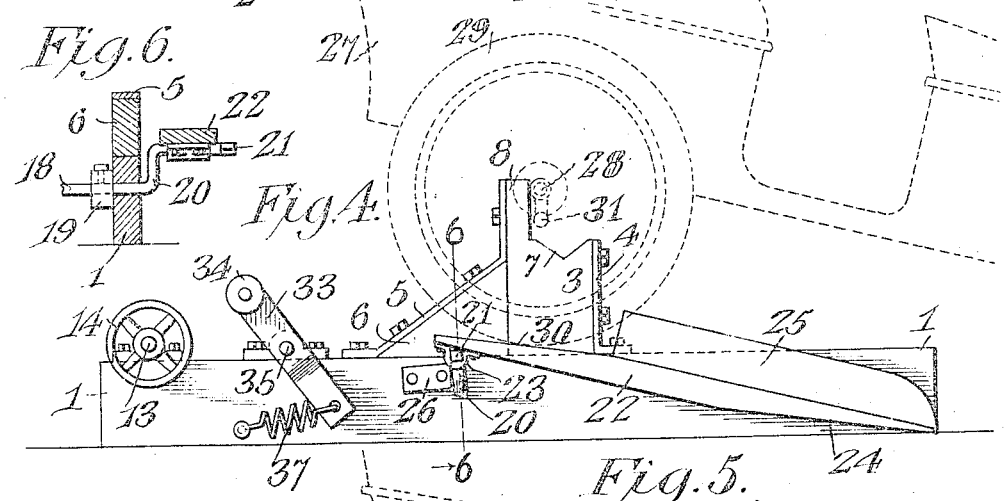
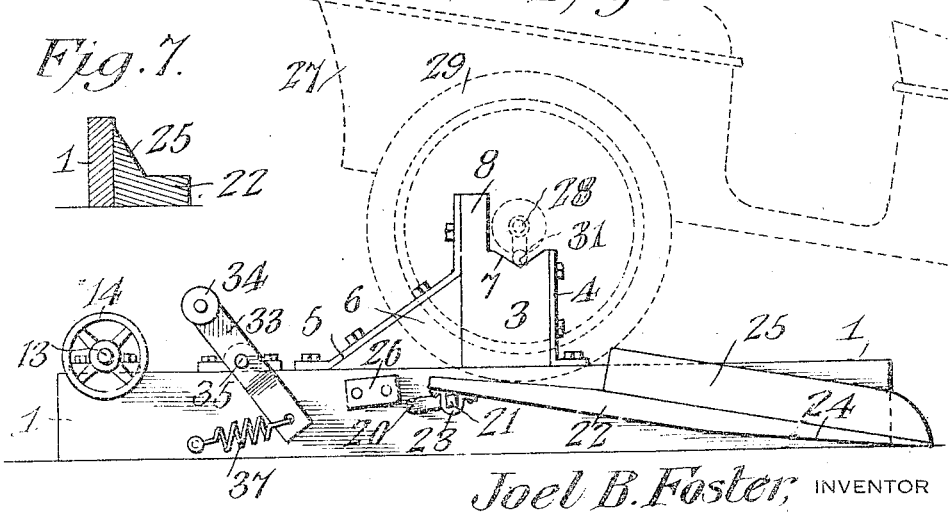
Joel B. Foster, INVENTOR
WITNESSES
BY
ATTORNEY

UNITED STATES PATENT OFFICE.

JOEL B. FOSTER, OF SHELBINA, MISSOURI.

AUTOMOBILE-JACK.

1,005,528.    Specification of Letters Patent.    Patented Oct. 10, 1911.

Application filed January 31, 1911. Serial No. 605,837.

*To all whom it may concern:*

Be it known that I, JOEL B. FOSTER, a citizen of the United States, residing at Shelbina, in the county of Shelby and State of Missouri, have invented a new and useful Automobile-Jack, of which the following is a specification.

This invention has reference to improvements in automobile jacks and is designed particularly for the utilization of the automobile engines as power units, so that the automobile may be employed without change of structure for furnishing power for various purposes when the automobile is not being used for transportation.

To this end the invention comprises a structure upon which the automobile may be moved by its own power and which by such movement of the automobile will cause the power wheels of the latter to be elevated and the automobile to be supported in such elevated position with its driving wheels free from contact with any support, the driving end of the automobile being then supported wholly by its axle or parts adjacent thereto, so that power may be transmitted from the wheels of the automobile by suitable belting, preferably by a countershaft carried by the structure forming the subject-matter of the present invention, so that power may be taken from the countershaft for utilization. In order that the driving end of the automobile may be properly raised to carry the wheels high enough, skids are provided, one for each driving wheel, and elevating means for one end of each skid is also provided, so that the automobile may be backed upon the skids until ultimately the axle of the automobile is brought into contact with the stop member which prevents further progressive movement of the automobile when the continued rotation of the wheels will cause longitudinal movement of the skids in a direction to depress the ends of the skids supporting the wheels, so that the automobile is lowered into supporting recesses, which because of their construction lock the automobile in the proper position for the taking off of the power from the drive wheels.

The invention will be best understood from a consideration of the following detailed description, taken in connection with the accompanying drawings forming a part of this specification, with the understanding, however, that while the drawings illustrate a practical form of the invention, the latter is susceptible of various modifications and practical embodiments differing in minor details from the showing of the drawings, and, therefore, the invention is not confined to the exact construction shown, for it may be varied therefrom while retaining the salient features of the invention.

In the drawings:—Figure 1 is a plan view of the improved jack showing a portion of an automobile in dotted lines in operative position. Fig. 2 is a side view of the structure of Fig. 1 also showing the automobile and driving connections therefrom in dotted lines. Fig. 3 is a section on the line 3—3 of Fig. 1, the automobile being omitted. Fig. 4 is a side view similar to that of Fig. 2, but showing the position of the automobile on having been backed upon the skids and prior to being lowered on the supports, the automobile being shown in dotted lines. Fig. 5 is a view similar to Fig. 4 but showing the position of the parts as the automobile comes to rest on the supports, the automobile being shown in dotted lines. Fig. 6 is a section on the line 6—6 of Fig. 4, distant parts being omitted. Fig. 7 is a section on the line 7—7 of Fig. 1.

Referring to the drawings, there is shown a frame composed of longitudinal members 1 joined together in spaced parallel relation by cross pieces 2, it being customary to make these parts of wood, but it will be understood that they may be made of metal instead of wood, and the shape and relation of the parts may be varied within limits depending upon the particular use to which the structure is to be put.

About midway of the longitudinal beams 1 are blocks 3 upstanding from the tops of the beams 1, and these blocks being made of wood may be secured to the beams 1 by straps 4, 5, respectively, the strap 5 being an angle strip confining an angle block 6 which will act to resist blows tending to loosen or overturn the standards 3 in the direction toward the blocks 6. Each block or standard 3 is formed on the upper surface with a notch 7 and at one side of the notch with an upstanding member 8, which, as will hereinafter appear, is designed to receive the impact of the axle of the automobile to prevent movement of the latter beyond a predetermined point. The blocks or standards 3 may be further strengthened by brace rods 9 extending toward the center portion of an intermediate cross piece 2. Furthermore, the longitudinal members 1 are connected by crossed brace rods 10 serving to strengthen and stiffen the structure. Supported upon certain of the cross beams 2 is a longitudinally disposed beam 11 which may extend to the end of the framework opposite that at which the automobile is to be received, and this beam 11 is designed to support certain bearings to be referred to. The appropriate ends of the beams 1 and 11 carry journal bearings 12 for a countershaft 13 sufficiently long to project beyond the outer faces of the beams 1 and there carry pulleys 14, to which reference will hereinafter be made. At an intermediate point the shaft 13 also carries another pulley 15 from which a belt 16 may lead to the machinery to be driven, or to any intermediate transmission mechanism.

Journaled in the longitudinal beams 1 are two shafts 17, 18, respectively, in line one with the other and having their contiguous ends journaled in the beam 11, these shafts being held against longitudinal movement by suitable collars 19 applied thereto. Each shaft 17, 18 extends beyond the outer face of the respective beam 1 and is there formed into a crank 20 with the outer end 21 squared or otherwise formed for the attachment of a manipulating member, such as a wrench. Each crank 20 carries one end of a skid 22 by means of a suitable clip 23, the other end of the skid being beveled, as indicated at 24, so that the end of the skid remote from the crank 20 may at all times rest upon the floor or ground where the device is used. For a portion of its length each skid 22 is formed with a side guard 25 upstanding from the active surface of the skid between the tread portion of the skid and the respective side beam 1, the skid in operation lying close against the side beam 1, the guard 25 acting to maintain the skid against the respective beam 1, while the wheels of the automobile are traversing the skid. The tread surfaces of the skids 22 are separated by substantially the distance between the drive wheels of the automobile measured in the direction of the length of the drive axle, and when it is desired to use the device the shafts 17 and 18 are turned by the application of a suitable wrench or other tool to the squared end 21 of the cranks 20 until these cranks have their free ends in a raised position, the corresponding ends of the skids 22 participating in this movement because of the clips 23, and the cranks are ultimately brought into engagement with the stops 26 on the outer faces of the corresponding longitudinal beams. The position of the skids as just described is shown in Fig. 4.

Now, an automobile, indicated in dotted lines at 27, backed upon the lower ends of the skids 22 will ride upon the skids until ultimately the drive axle of the automobile, indicated at 28, is in engagement with the upstanding abutment 8 of each block 3, the wheels of the automobile, indicated in dotted lines at 29, still resting on the tread portion of the skids and this portion of each skid may be slightly beveled, as indicated at 30, with relation to the main part of the tread portion, so that the inclination of the beveled portion 30 to the horizontal is not so pronounced as the other portion of the skid where engaged by the wheels. This construction is, however, not mandatory. As soon as the axle 28 of the automobile comes into engagement with the abutments 8 further progressive movement of the automobile is arrested, but the wheels 29 may still continue to rotate with the result that the skids where engaged by the wheels now receive a more powerful impulse than when the automobile is being backed up the skids, with the result that the shafts 17 and 18 are turned to carry the cranks 20 in a direction away from the stop blocks 26, and as these blocks may be located so that the cranks rest against them with an inclination to the vertical, considering the device as resting on a horizontal surface, these cranks must be moved as through a rising arc with the then upper ends of the skids participating in such rising movement before the cranks can reach the highest point of their travel, after which they will move through a lowering arc, thus causing the axle 28 of the automobile to drop until finally it rests against the upper ends of the blocks 3 with the truss rod or rods 31 usually present on the power axle of an automobile in the notches 7. The relative position of the automobile to the device when the power axle of the machine is resting on the supporting blocks 3 is shown in Fig. 5. When this position has been assumed, the skids 22 may continue their movement toward the lowest position, either by gravity or by an appropriate force applied to the squared ends 21 of the cranks 20, until ultimately the parts assume about the position shown in Fig. 2 with the skids out of the way of the wheels 29.

Now, suitable belts 32 may be carried from the tires of the automobile drive wheels to the respective pulleys 14 and in order that these belts may be readily applied and yet engage the wheeled tires and pulleys with sufficient grip, each belt 32 may be controlled by a belt tightener comprising a lever 33 carrying at one end a roller 34 designed to engage the respective belt 32 and at an intermediate point provided with a pivot 35 carried by a journal bearing 36 or other support on the respective beam 1 at an appropriate point. The belt tightener lever 33 is shown in the drawings as normally controlled by a spring 37 connected at one end to the respective beam 1 and at the other end to that end of the lever 33 remote from the roller 34. Of course, it will be understood that the force of gravity may be utilized instead of a spring for the same purpose, but it is unnecessary to go into any details on such matters, since any suitable belt tightener will answer the purpose. With the belt 16 connected to the parts to be driven and the drive wheels of the automobile connected by the belts 32 to the pulleys 14 on the counter-shaft 13, the power of the engines of the automobile is readily transferred to the parts to be driven, so that the possessor of an automobile may utilize the power available for any purpose desired without in any manner modifying the structure of the automobile and without interference in any manner with the use of the automobile at any other time for the purposes for which the automobile is primarily intended.

The automobile is very readily placed upon the jack by its own power, and when once there located is firmly held against displacement while the available power of the automobile is being utilized for other purposes than the propulsion of the automobile.

It will be observed that the automobile raises itself to the appropriate height by way of the skids 22 and then by a continuation of the tractive movement of the power wheels the skids are caused to gradually lower the automobile to its sustaining elevated support without subjecting the automobile structure to any jars which might occur were the vehicle allowed to gravitate freely on to an elevated support from a greater elevation to which it is lifted in order to bring it into overstanding relation to the said elevated support, in order that it might be lowered thereonto.

When the automobile is to be removed from the jack, a wrench or lever applied to the squared ends of the cranks 20 may be manipulated to elevate the ends of the skids carried by said cranks until the automobile is free from the blocks 3, and then the automobile may be moved down the skids until free from the jack.

What is claimed is:—

1. An automobile jack provided with supports for the power end of an automobile for sustaining the power end of the automobile in an elevated position, skids for the power wheels having the ends remote from those first receiving the wheels of the automobile adjacent the automobile supports and movable sustaining means for the second named ends of the skids responsive to the power wheels of the automobile for movement of the skids out of operative relation to the said wheels.

2. An automobile jack comprising a suitable frame, supports for the power axle of the automobile for holding the same in an elevated position, and skids free to move longitudinally at their receiving ends and provided with eccentric connections to the frame at the ends remote from their receiving ends, said eccentric connections being adjacent the elevated supports for the automobile.

3. An automobile jack comprising a suitable frame, automobile sustaining means for holding the power end of an automobile in an elevated position, skids for receiving the wheels of the automobile and free to move longitudinally at the receiving ends, and supports for the ends of the skids remote from their receiving ends comprising crank members adjacent the upholding supports for the power end of the automobile, said crank members being rotatable to cause a rise or fall of the ends of the skids supported by said crank members on the turning of the cranks.

4. In an automobile jack, a suitable frame, upholding supports for the driving end of the automobile, skids carried by the frame for receiving the power wheels of the automobile, crank supports for the ends of the skids remote from the receiving ends and adjacent the automobile supports, said crank supports being movable to elevate or lower the corresponding ends of the skids, and stop members in the paths of the crank supports and positioned to engage said crank supports to one side of the point of highest elevation of the ends of the skids engaged by said cranks.

5. In an automobile jack, a suitable frame, upholding supports for the driving end of the automobile, skids carried by the frame for receiving the power wheels of the automobile, crank supports for the ends of the skids remote from the receiving ends and adjacent the automobile supports, said crank supports being movable to elevate or lower the corresponding ends of the skids, and stop members in the paths of the crank supports and positioned to engage said crank supports to one side of the point of highest elevation of the ends of the skids engaged by said cranks, said crank supports each having one end shaped for the application of a manipulating tool.

6. An automobile jack comprising a suitable frame, supports on the frame for holding the drive end of an automobile in an elevated position, and skids connected to the frame for guiding the drive wheels of the automobile toward the supports for the drive end of the automobile, said skids being free to move longitudinally at the receiving ends and connected to the frame at the ends remote from the receiving ends, the connecting means being movable to elevate or lower the ends of the skids remote from the receiving ends.

7. In an automobile jack, supports for holding the drive end of an automobile in an elevated position, said supports being provided with abutments for arresting progressive movement of the automobile, and skids for directing an automobile to the supports, said skids being free to move longitudinally and responsive to the rotation of the power wheels of the automobile for longitudinal movement when progressive movement of the automobile is arrested by the abutments.

8. An automobile jack provided with elevated supports for the drive end of an automobile, said supports having abutments for arresting progressive movement of the automobile, skids for receiving the wheels of the automobile and directing the drive end of the automobile to the abutments on the supports, and carrying means for the ends of the skids remote from their receiving ends, said carrying means comprising cranks, one for each skid, said cranks being movable in a direction to elevate and lower the corresponding ends of the skids, and stop means for the cranks for holding them against a lowering movement in one direction.

9. In an automobile jack, a suitable frame, supports for holding the drive end of an automobile in an elevated position, and skids for directing the drive wheels of the automobile toward the supports, said skids being connected to the frame and having side webs or flanges adjacent the frame for holding the skids to the frame when being traversed by the automobile wheels.

10. In an automobile jack, a suitable frame, supports for holding the drive end of an automobile in an elevated position, skids for directing the drive wheels of the automobile toward the supports, said skids being connected to the frame and having side webs or flanges adjacent the frame for holding the skids to the frame when being traversed by the automobile wheels, and eccentrically acting supporting means for the ends of the skids remote from their receiving ends, said supporting means for the skids being movable to elevate and lower the corresponding ends of the skids.

In testimony, that I claim the foregoing as my own, I have hereto affixed my signature in the presence of two witnesses.

JOEL B. FOSTER.

Witnesses:
FRANK DIMMITT,
E. J. KING.